(12) United States Patent
Velipasaoglu et al.

(10) Patent No.: US 10,404,524 B2
(45) Date of Patent: Sep. 3, 2019

(54) RESOURCE AND METRIC RANKING BY DIFFERENTIAL ANALYSIS

(71) Applicant: Lightbend, Inc., San Francisco, CA (US)

(72) Inventors: Omer Emre Velipasaoglu, San Francisco, CA (US); Arun Kejariwal, Fremont, CA (US); Alan Honkwan Ngai, Santa Clara, CA (US); Craig David Upson, Berkeley, CA (US); Uday K. Chettiar, Mountain View, CA (US)

(73) Assignee: Lightbend, Inc., San Francisco, CA (US)

( * ) Notice: Subject to any disclaimer, the term of this patent is extended or adjusted under 35 U.S.C. 154(b) by 65 days.

(21) Appl. No.: 15/841,198

(22) Filed: Dec. 13, 2017

(65) Prior Publication Data

US 2018/0167260 A1    Jun. 14, 2018

Related U.S. Application Data

(60) Provisional application No. 62/433,699, filed on Dec. 13, 2016.

(51) Int. Cl.
| | |
|---|---|
| G06F 15/173 | (2006.01) |
| H04L 12/24 | (2006.01) |
| H04L 12/26 | (2006.01) |
| H04L 5/00 | (2006.01) |

(52) U.S. Cl.
CPC ........ *H04L 41/0609* (2013.01); *H04L 5/0058* (2013.01); *H04L 41/0654* (2013.01); *H04L 41/0681* (2013.01); *H04L 41/22* (2013.01); *H04L 43/067* (2013.01)

(58) Field of Classification Search
None
See application file for complete search history.

(56) References Cited

U.S. PATENT DOCUMENTS

| | | | |
|---|---|---|---|
| 8,676,964 B2* | 3/2014 | Gopalan | H04L 41/142 370/230.1 |
| 8,694,635 B1* | 4/2014 | Anand | G06Q 50/01 709/224 |
| 2008/0134193 A1* | 6/2008 | Corley | G06F 9/52 718/104 |
| 2016/0285700 A1* | 9/2016 | Gopalakrishnan | G06N 7/005 |
| 2016/0381580 A1* | 12/2016 | Kwan | H04W 24/08 370/252 |

* cited by examiner

*Primary Examiner* — Mohamed Ibrahim
(74) *Attorney, Agent, or Firm* — Haynes Beffel & Wolfeld LLP; Ernest J. Beffel, Jr.

(57) ABSTRACT

The technology disclosed relates to differential analysis of sets of time series pairs. In particular, it relates to building estimators of magnitude of difference between two time series. After the basic estimators are built, they are combined into ensemble estimators using linear or nonlinear prediction models to improve their accuracy. In one application, the ensemble is used for estimating the magnitudes of difference over sets of metric pairs observed from distributed applications and systems running over a computer network. The metric pairs are then ranked in decreasing order of magnitude of difference to guide an operator in prioritizing his root cause analysis of faults, thereby reducing the time-to-resolution of problems.

20 Claims, 8 Drawing Sheets
(4 of 8 Drawing Sheet(s) Filed in Color)

RESOURCE AND METRIC RANKING BY DIFFERENTIAL ANALYSIS

CROSS REFERENCE TO OTHER APPLICATION

This application claims the benefit of U.S. Provisional Patent Application No. 62/433,699, entitled "RESOURCE AND METRIC RANKING BY DIFFERENTIAL ANALYSIS," filed on Dec. 13, 2016. The provisional application is hereby incorporated by reference for all purposes.

INCORPORATIONS

Materials incorporated by reference for all purposes in this filing include the following:

"ORGANIZING NETWORK PERFORMANCE METRICS INTO HISTORICAL ANOMALY DEPENDENCY DATA," U.S. Non. Prov. application Ser. No. 14/276,826, filed May 13, 2014 issued as U.S. Pat. No. 9,558,056;

"ORGANIZING NETWORK PERFORMANCE METRICS INTO HISTORICAL ANOMALY DEPENDENCY DATA," U.S. Non. Prov. application Ser. No. 14/276,846, filed May 13, 2014, issued as U.S. Pat. No. 9,632,858;

"ORGANIZING NETWORK PERFORMANCE METRICS INTO HISTORICAL ANOMALY DEPENDENCY DATA," U.S. Non. Prov. application Ser. No. 15/494,519, filed Apr. 23, 2017;

"ANOMALY DETECTION USING CIRCUMSTANCE-SPECIFIC DETECTORS," U.S. Non. Prov. application Ser. No. 14/877,923, filed Oct. 7, 2015;

"HIERARCHICAL SERVICE ORIENTED APPLICATION TOPOLOGY GENERATION FOR A NETWORK," U.S. Non. Prov. application Ser. No. 14/878,910, filed Oct. 8, 2015;

"CONTEXT-AWARE RULE ENGINE FOR ANOMALY DETECTION," U.S. Non. Prov. application Ser. No. 15/289,112, filed Oct. 7, 2016;

"TUNING CONTEXT-AWARE RULE ENGINE FOR ANOMALY DETECTION," U.S. Non. Prov. application Ser. No. 15/289,114, filed Oct. 7, 2016;

"SYSTEMS AND METHODS OF CONSTRUCTING A NETWORK TOPOLOGY," U.S. Non. Prov. application Ser. No. 15/289,080, filed Oct. 7, 2016; and "SYSTEMS AND METHODS OF CONSTRUCTING A NETWORK TOPOLOGY," U.S. Non. Prov. application Ser. No. 15/289,115, filed Oct. 7, 2016.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Ensuring high availability, performance and reliability of an Internet service requires extensive telemetry data. In this regard, it is routinely touted by service providers that they monitor hundreds of millions of metrics. Over the years, data collection has become a commodity. The challenge however is to analyze the data to mitigate the customer impact owing to the issue at hand. Given the deluge of metrics, a key first question in the context of Root Cause Analysis is: into which metrics should one dive deeper? Broadly speaking, the question can be dissected into the following two ways: 1) which metrics have changed "significantly" compared to their respective histories; and 2) in which order should one analyze the metrics from step 1.

Figure 1:
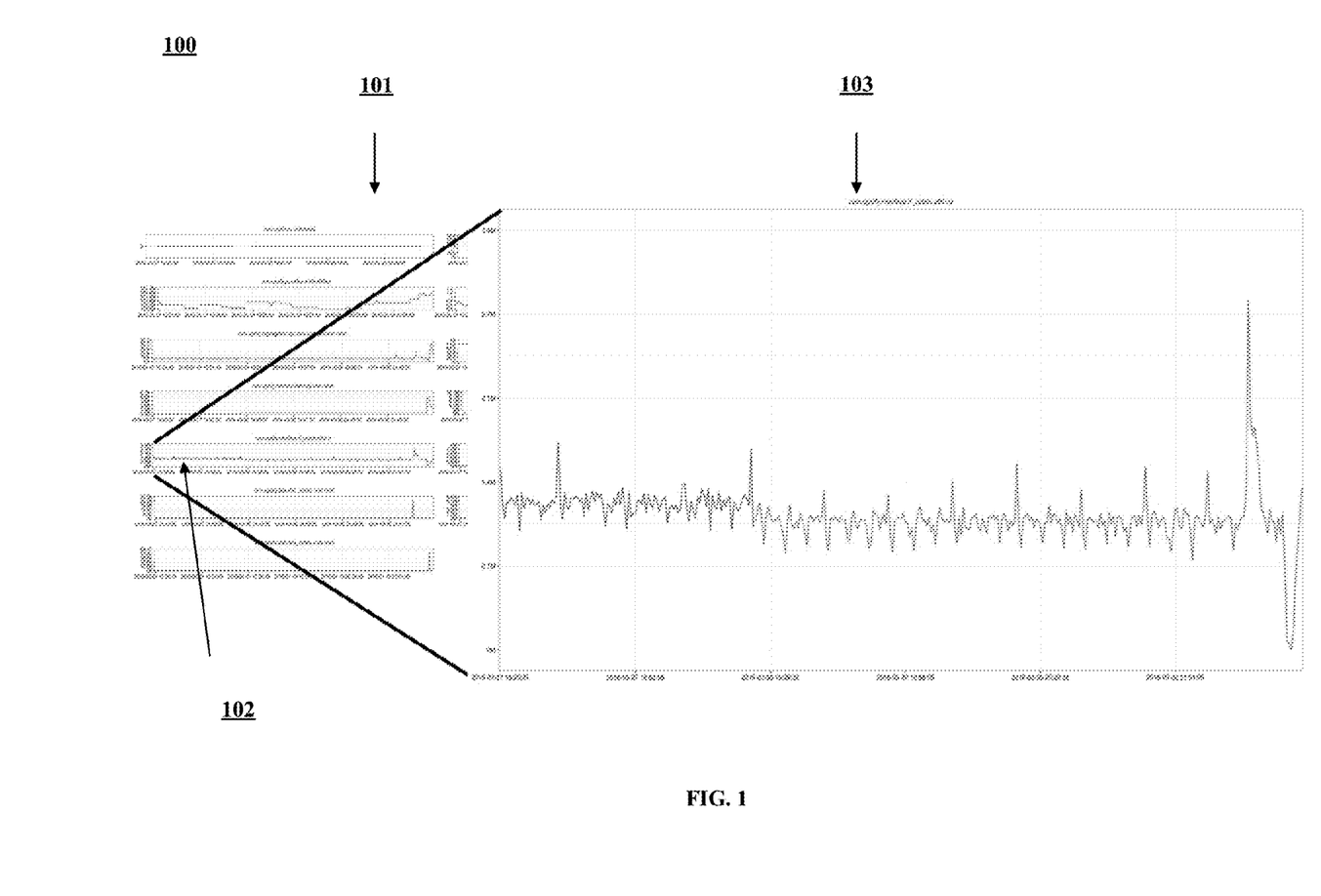
FIG. 1 illustrates the challenges of visual inspection of metrics for identifying differences between reference and query periods and ranking them by relative strengths of such differences.

One can potentially argue that the above can be done visually. Primarily, there are two reasons why this is not feasible: i) owing to large volume of metrics ii) more importantly, it is error prone. FIG. 1 illustrates these challenges. On the left column (101), 7 candidate metrics are depicted, each containing a reference section (in blue) and a query section (in red). Due to compression of the y-axis, it is difficult to tell that there is a change of nearly 20 percent of mean value between the reference and query portions of the highlighted metric (102). One can look at these metrics one at a time, as in the right column (103), to be able to detect such subtle differences more easily. However, inspecting the metrics one by one would make it difficult to rank the metrics by the strength of relative changes and it will be very time consuming.

A system that automatically ranks metrics by differences would provide invaluable guidance to the operational personnel to kick-off his/her deep dive analysis. The guidance helps to minimize the Time-To-Resolve which in turn is key for end-user experience and thereby to the bottom line.

BRIEF DESCRIPTION OF THE DRAWINGS

The patent or application file of the U.S. priority application contains at least one drawing executed in color. Copies of this patent or patent application publication with color drawing(s) will be provided by the U.S. Patent and Trademark Office upon request and payment of the necessary fee. The color drawings are incorporated by reference herein.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

INTRODUCTION

To address the aforementioned problem, disclosed here is an invention to improve performance of a network under monitoring automatically by ranking a given set of time series by the magnitudes of difference in a given query period relative to a given reference period. Specifically, implementations accumulate for a resource running on the network, data for a performance metric being applied to monitor the network. The data includes a reference time series and a query time series. The reference time series represents the performance metric during a historic time period and the query time series represents the performance metric during a current time period. A number of methods to estimate the magnitude of difference between the query and reference periods of a time series are developed. Further provided are methods to combine these techniques into a quantifiably better estimator of magnitude of difference. Also is shown how to rank sets of time series with respect to each other, where a set can be but not limited to a natural grouping of time series such as those belonging to the same physical or logical computer network host or distributed application. Based on the determined magnitude of difference, determining whether the resource is undergoing anomalous performance and whenever a resource is identified as undergoing anomalous performance, raising a signal that identifies anomalous performance for further action.

From here on we will use the names time series and metric interchangeably. Also, from here on we will use the term "resource" for a computer network host, a distributed application or any other collection of objects from which metrics can be collected.

Figure 2:
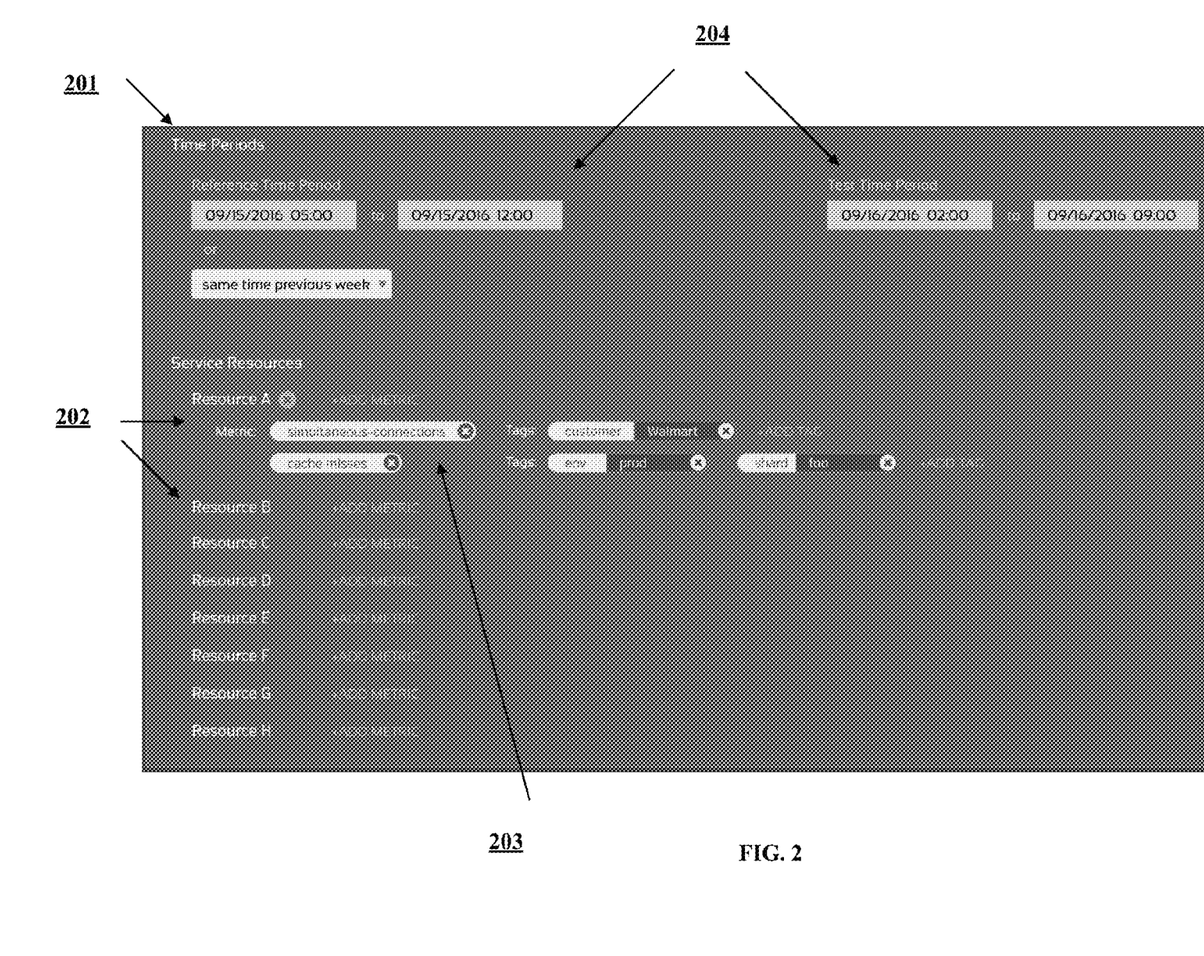
FIG. 2 illustrates the user interface the operator uses in one implementation to select resources and metrics of interest as well as reference and query (or test) periods for automated analysis.
Figure 3:
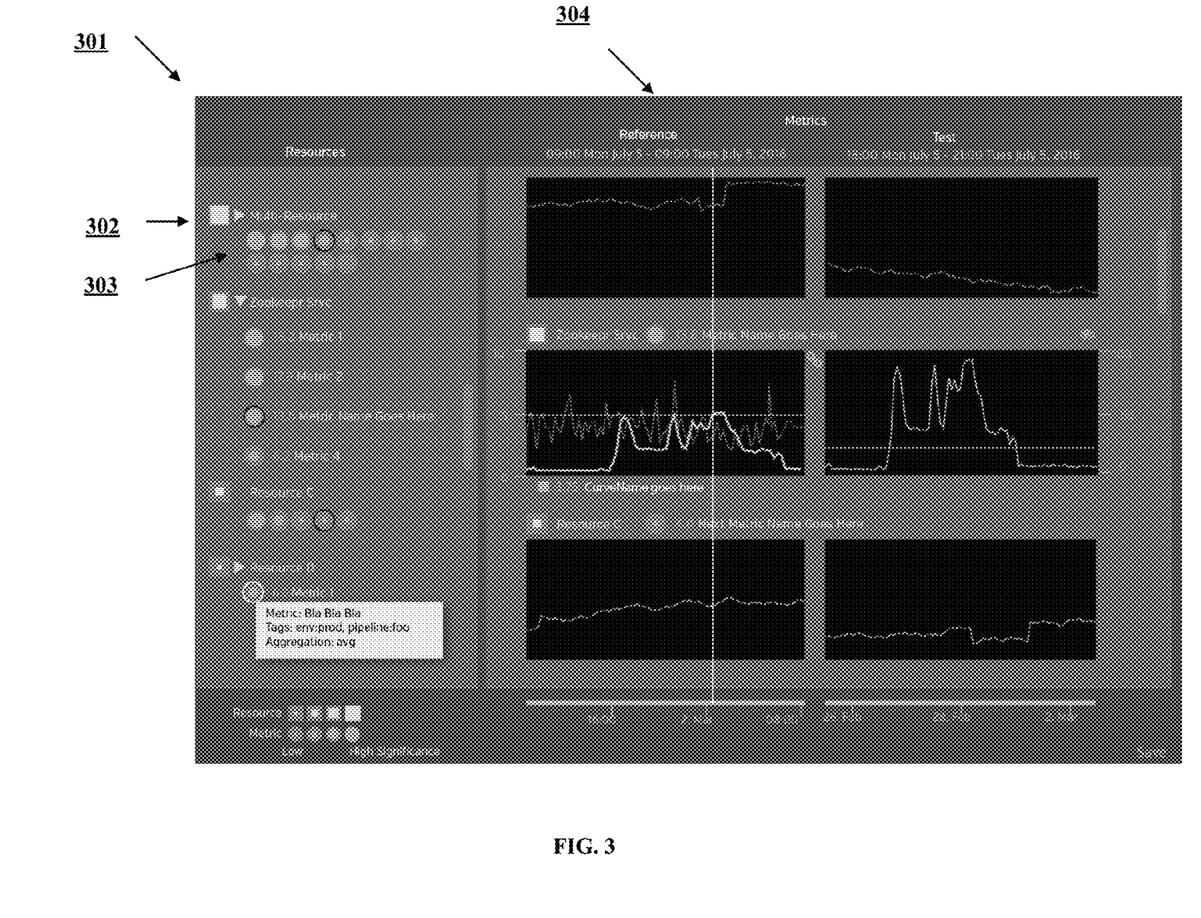
FIG. 3 illustrates the user interface the operator uses in one implementation to consume the results of the automated analysis.

In one implementation of this invention, as illustrated in FIG. 2, an operator is provided with a user interface (UI) (201) which presents a set of resources (202). The operator selects one or more resources to be evaluated. Further, the UI presents available metrics (203) for each resource and the user selects subsets of metrics of interest for each resource. Finally, the operator selects a reference period and a query (or test) period of observations as in 204. The reference and query metrics are then submitted to the automated analysis system described in this invention. The result is presented back to the operator as a report as illustrated in FIG. 3. The report (301) contains the list of resources (302) in order of decreasing summary score that reflects the aggregate over magnitudes of difference of its metrics. For each resource, the related metrics (303) are listed in decreasing order of magnitude of difference between the reference and query periods of the metrics. Furthermore, when a resource is selected, the metrics for that resource are displayed on the right panel (304). In particular, each row shows a pair of observation periods of the same metric. The left column displays the metric within the reference period, and the right column displays the same metric in the query (or test) period. The row order reflects the ranking of metric pairs in decreasing order of difference magnitude estimated by the automated methods described below.

Basic Methods to Estimate Magnitude of Metric Differences

Comparison of the metrics is performed after the starting time stamps of the reference and the query periods are aligned. In other words, time indices of each observation period are made to start from time zero by subtracting the first time index from all the time indices of that observation period.

A basic method of measuring the similarity of two metrics is cross-correlation, for example Pearson-correlation. Since correlation is bounded it can easily be used to produce an estimate of difference magnitude by normalizing it and subtracting from one (1). Cross-correlation measures the degree that the divergences from the respective means of the metrics are aligned. As such, it is sensitive to minor shifts in the time axes and correct alignment of the metrics before comparison is paramount.

Another basic method of measuring the similarity of two metrics is Dynamic Time-Warping (DTW). It is widely used in speech processing, for instance, to compare the utterances of the same words by two speakers, one that speaks faster than the other. DTW finds the warping of the time index of the query metric (with certain bounds and costs on the amount of warping) that produces the minimal total distance (e.g. Euclidean distance) between the warped query metric and the reference metric. The total distance is unbounded but nevertheless can be used as a measure of magnitude of difference between two metrics. DTW addresses the time-shift sensitivity issues faced by cross-correlation methods, but it has its own shortcomings. For example, time indices of short bursts such as spikes can be warped out of comparison, rendering the method insensitive to comparing metrics with sparse spikes.

As another basic method, one can use a non-parametric statistical test of difference between two distributions, such as Kolmogorov-Smirnov (KS) test. In this method, one would ignore the time-indices completely and compare the reference metric to the query metric as if they are bags of values. Either the test statistic itself or the reciprocal of the p-value of the test can be used as an estimate of the magnitude of difference between the metrics. There is a trade-off when selecting the size of the window for applying the KS test. Large windows yield better certainty for the test itself at the risk of losing most of the temporal structure of the sequence. Choosing a window size that yields a good trade-off is important for this method. Also, using sliding windows recaptures some partial ordering on the observations.

An Enhanced Basic Method to Estimate Magnitude of Metric Differences

Figure 5:
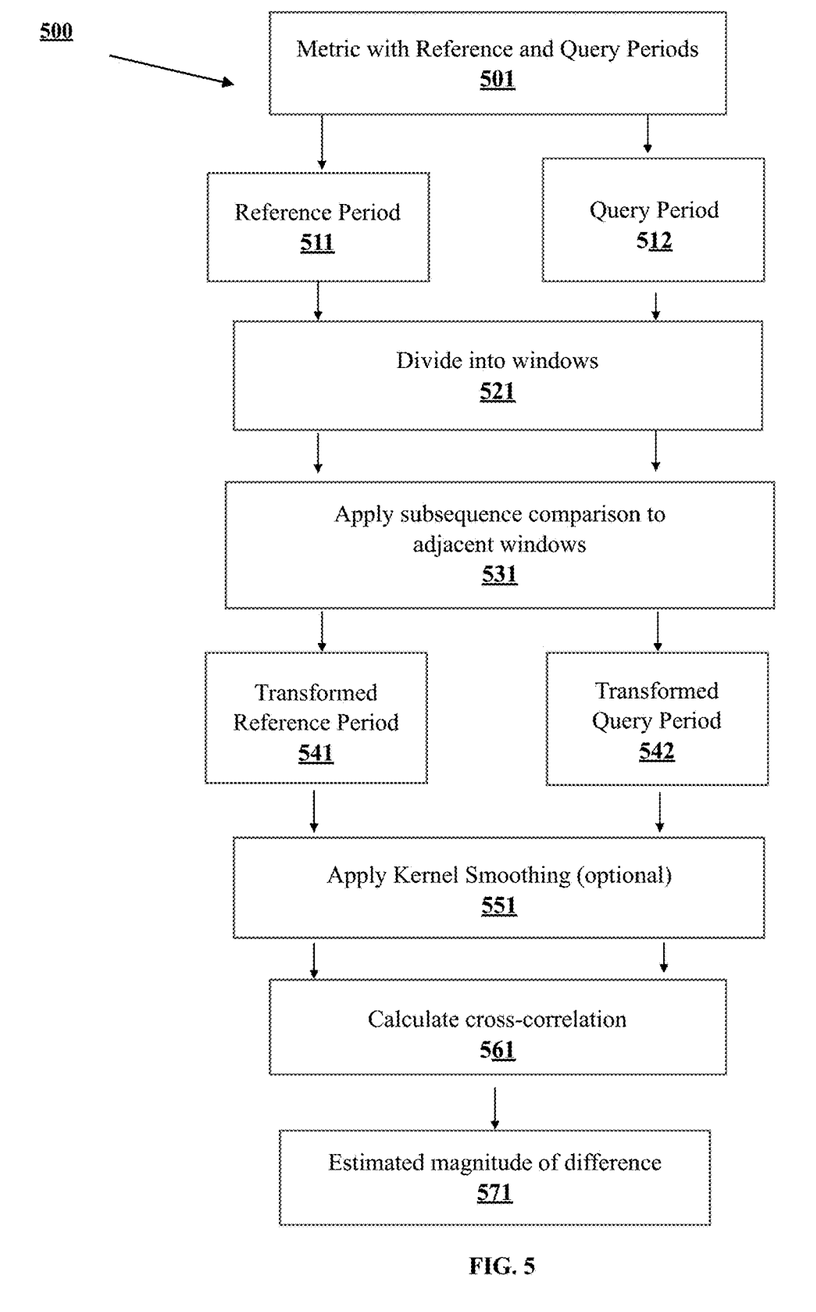
FIG. 5 shows a flowchart of an enhanced basic method to estimate magnitude of metric differences.

The technology disclosed includes an enhanced estimator to address the shortcomings of the above methods. The enhanced method is summarized in the flowchart 500 in FIG. 5. The method first transforms the reference (511) and the query (512) observation periods of the metric (501). The transformation involves two steps:

1. Step 521: Divide the metric into a sequence of overlapping or non-overlapping windows.
2. Step 531: Compare the metric sub-sequences in neighboring windows using one of the following sub-sequence comparison methods:
    a. A distribution similarity test such as KS test, where the output of comparison is the test statistic or the reciprocal of the p-value of the test,
    b. Cross-correlation, where the output of comparison is one minus the normalized correlation coefficient, c. DTW, where the output is the DTW distance between the windows,
d. Normalized power spectrum density (PSD) estimates, where the output of the comparison is one minus the inner product of PSD estimates.

Figure 4:
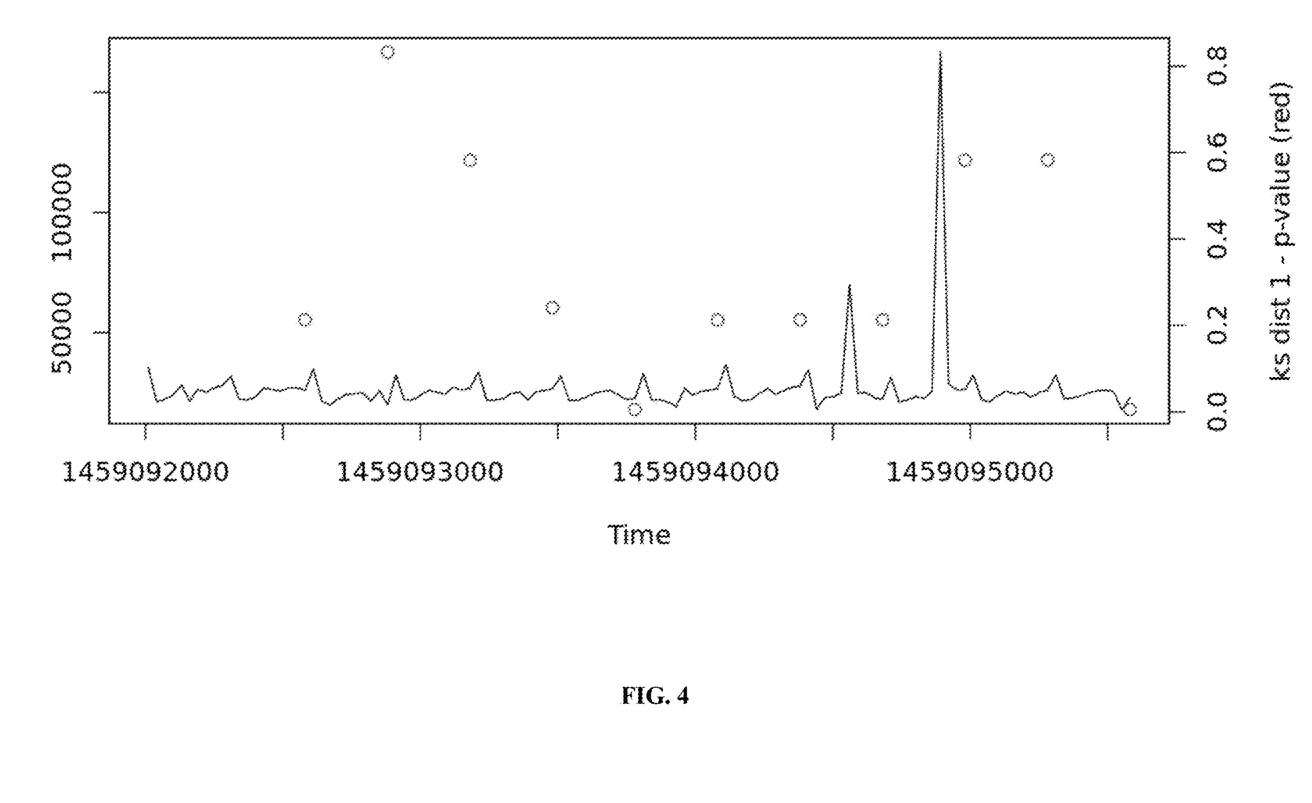
FIG. 4 depicts the transformation of a metric by comparing distribution differences between sliding windows.

Transformation of a metric in this manner yields a self-similarity sequence. Since each window has time stamped boundaries, time stamp of one of the boundaries (e.g. the rightmost boundary) can be used the express the transformation as a time series. An example of a metric and its transformation is shown in FIG. 4.

Once the transformed reference (541) and the query (542) observation periods of the metric are obtained as above, the transformed reference-query pairs are compared by cross-correlation as in step 561.

In cases where the transformation window boundaries are far apart in time, a kernel-smoothed correlation method can be used. Kernel smoothing can be performed by convolving the transform time series with a square or a Gaussian kernel as in step 551. The width of the kernel should be selected to capture the desired interactions (e.g. if a 10-second interval between the observations can be considered as co-occurrence, then the width of the square should be set to 5 seconds.)

The result of this procedure is an enhanced estimate of the magnitude of difference between the reference and query observation periods of a metric as in step 571.

Combining the Basic Estimators into Ranking Scores for Metric Pairs

Each basic method described above has particular strengths and shortcomings. By combining them, one could leverage the strengths and overcome the shortcomings. Each method will produce an estimate of magnitude of difference between a pair of metrics. We combine these estimates into a final estimate as described below. The metric pairs are then ranked by this final estimate in decreasing magnitude of difference, thereby helping the operator to focus on the most significant differences first.

Linear Combination

Figure 6:
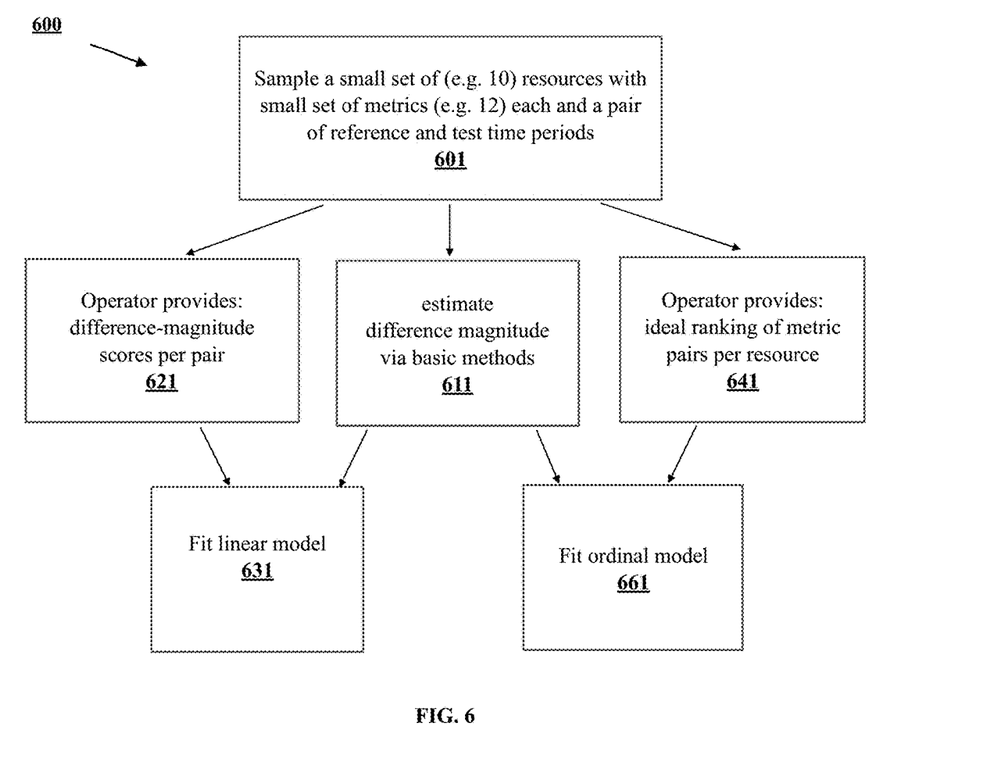
FIG. 6 shows a flowchart for producing linear combinations of scores obtained via basic estimators.

One alternative to combine difference magnitudes estimated by various basic methods is by using a linear model, as depicted in the flowchart 600 of FIG. 6. In order to fit a linear regression model, we use a training set (601) that includes a small number of resources (e.g. 10) each with a small set of metrics (e.g. 12) and a pair reference and test of time periods. We first score these metrics using the selected basic methods described above as in step 611. We ask an expert operator to provide a score between 0 and 10 for the magnitude of difference for each metric pair, 0 being no difference and 10 being the most amount difference that is or can be observed, as in step 621. We then use these scores as target variables and fit a linear regression model as in step 631. The result is weights for each basic method as well as an intercept to produce final scores calibrated to the target scores in the training set.

Another alternative is to build the training set by asking the operator to rank the metric pairs within each resource by magnitude of difference, as in step 641. When the training set is compiled this way, an ordinal regression model is fit to find weights for the basic methods as well as a set of thresholds that maps the combined scores to ranks, as in step 661.

Nonlinear Combination of Basic Estimators into Ranking Scores for Metric Pairs

Figure 7:
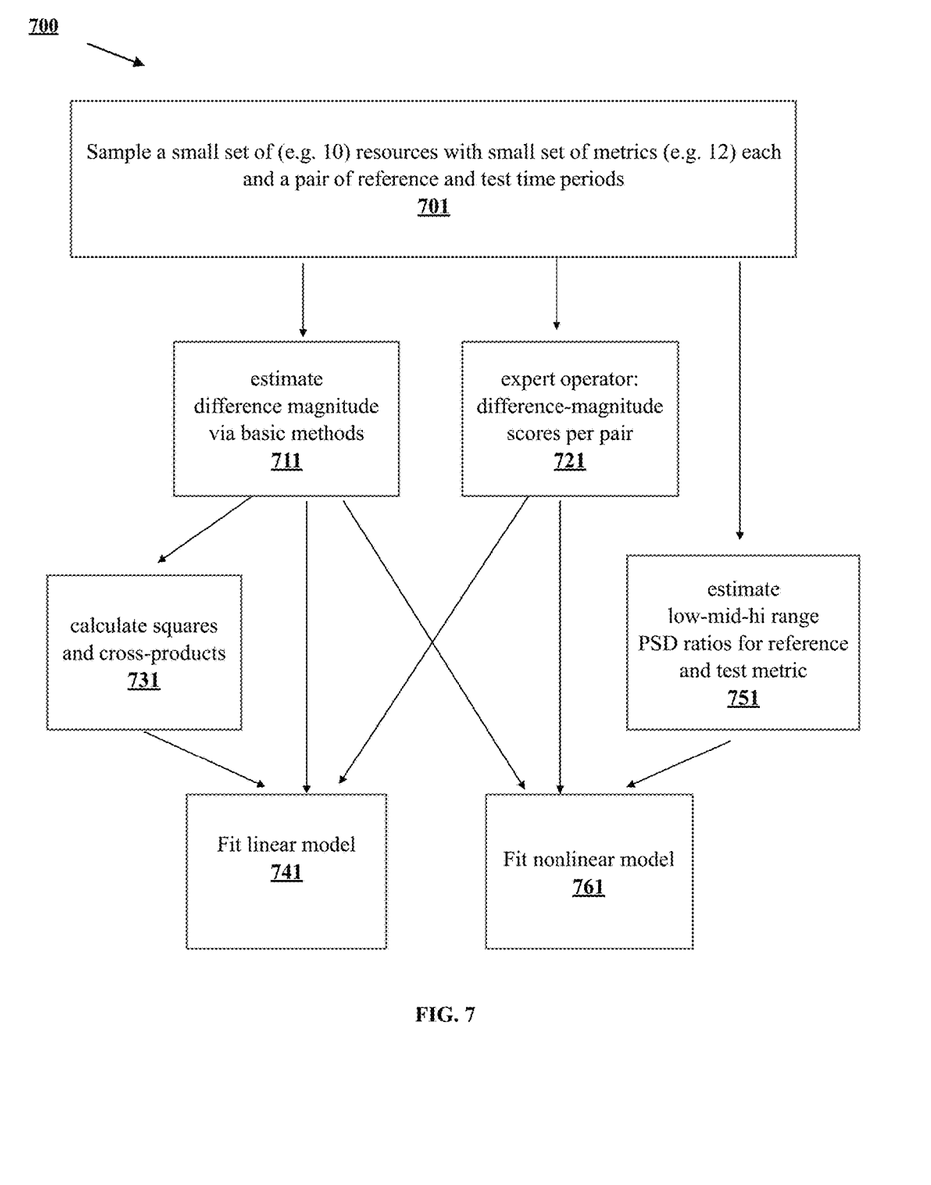
FIG. 7 shows a flowchart of producing nonlinear combinations of scores obtained via basic estimators.

The strengths and weaknesses of the basic methods are related to the characteristics of the metrics under evaluation. As mentioned before, for example, DTW can ignore differences due to spikes, whereas KS test is insensitive to changes of period as long as the dynamic range stays the same. When basic methods are combined with linear methods, it can amplify the weaknesses along with the strengths. Nonlinear methods of combination can remedy this problem. The flowchart 700 in FIG. 7 shows two alternatives for nonlinear combination methods. In both cases, we use a training set (701) that includes a small number of resources (e.g. 10) each with a small set of metrics (e.g. 12) and a pair reference and test of time periods. We first estimate the magnitudes of difference between the reference and query periods of these metrics using the methods described above (and, as depicted in step 711). We ask an expert operator to provide a score between 0 and 10 for the magnitude of difference for each metric pair, 0 being no difference and 10 being the most amount difference that is or can be observed, as in step 721.

In one alternative, we calculate the polynomial expansions of the basic method scores. In other words, we compute the squares and cross-products of basic estimates of the magnitudes of differences as in step 731, and use them along with the basic estimates in a linear regression model as in 741 using the expert scores (721) as regression targets.

In another alternative, for each metric pair, we generate regression variables that capture the characteristics of the metrics. For example, we compute the power spectrum density of each of the metrics and estimate the fraction of cumulative power that falls into a low, medium and high frequency range, as in step 751. For a pair of metrics, this example yields six features that can be used to capture the characteristics of the metric pair three for the reference metric and three for the query metric. Then, we fit a nonlinear model (761) such as a Decision Tree or a Gradient Boosted Regression model using the basic method estimates, the regression variables capturing the characteristics of the metrics and the target scores obtained in the training set from an expert as explained above.

Ranking of Resources

In one implementation, the report (301) in FIG. 3 includes a list of resources ranked by an aggregate score that reflects the summary of magnitudes of difference of its metrics, where the summary is the average of the difference scores of the metrics belonging to that resource. In another implementation, the summary can be an order statistic such as median, maximum or minimum of the scores of the metrics.

Particular Implementations

In one implementation, the technology disclosed presents a system that determines a magnitude of difference between a reference time series and a query time series.

The system accumulates for a resource running on the network, data for a performance metric being applied to monitor the network. The data can include a reference time series and a query time series, wherein the reference time series represents the performance metric during a historic time period and the query time series represents the performance metric during a current time period.

The system transforms the reference and query time series into transformed reference and query time series. Transformation includes—(1) segmenting the time series into sub-sequences of overlapping or non-overlapping windows with time stamped boundaries, (2) using a sub-sequence comparison function to compare adjacent window pairs and producing, for each window pair, a statistic or a significance value as a result of the comparison, and (3) aligning the reference window pairs with the query window pairs by attaching, to respective statistics or significance values, a time stamp of one of the time stamped boundaries.

The system then compares the transformed reference and query time series using cross-correlation to determine the magnitude of difference between the reference and query time series. Based on the determined magnitude of difference, the system determines whether the resource is undergoing anomalous performance and whenever a resource is identified as undergoing anomalous performance, raising a signal that identifies anomalous performance for further action.

The first system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The system can further compare the transformed reference and query time series by recording one minus the normalized cross-correlation and estimating the magnitude of difference between the reference and query time series.

The reference and query time series can be reference and query time periods of a single time series. The single time series can be a performance metric collected from a resource.

The sub-sequence comparison function can be Kolmogorov-Smirnov (KS) test.

The system can further align the reference window pairs with the query window pairs by attaching, to the respective statistics or significance values, —(1) a time stamp of a right time stamped boundary of a right window, (2) a time stamp of a left time stamped boundary of a left window, (3) a time stamp of a left time stamped boundary of a right window, or (4) a time stamp of a right time stamped boundary of a left window, where time increases from left to right.

The system can further compare the transformed reference and query time series by determining a dynamic-time-warping (DTW) distance and estimating the magnitude of difference between the reference and query time series.

The system can further apply the cross-correlation after smoothing the transformed reference and query time series by convolving with a square or a Gaussian kernel.

Raising a signal can include raising an exception interrupting a normal flow of processing at a monitoring terminal.

Further action can include rerouting traffic, obtaining further inspection; automatically searching for and applying a service update to the resource or automatically restarting the resource, combinations of these or other actions reasonably contemplated to address the anomalous performance.

Other implementations may include a non-transitory computer readable storage medium storing instructions executable by a processor to perform functions of the system described above. Yet another implementation may include a method performing the functions of the system described above.

In another implementation, the technology disclosed presents a system for combining basic estimates of magnitudes of difference between two time series into an improved estimate.

The system first samples a training sample of resources and, for each sampled resource, samples a set of time series along reference and query time periods. The training sample can include 10 resources and 12 metrics per resource.

The system then receives ideal magnitudes of difference estimates as target scores. The target scores can be received from an expert.

The system fits a regression model to the target scores using the basic estimates of the magnitudes of difference. The regression model can be a linear model. The regression model can be a nonlinear model, such as a decision tree or a gradient boosted regression model.

The system then stores output of the regression model as the improved estimate.

In some implementations, additional regression variables can be generated by using square and cross-product functions on the basic estimates of the magnitudes of difference.

In some implementations, the system can receive an ideal ordering of the metrics for each resource separately used as target orderings for fitting an ordinal regression model using the additional regression variables.

The additional regression variables can be generated by estimating a power spectrum density (PSD) of each of the time series, estimating a total power in each time series, dividing a frequency axis in to three regions as low, medium, and high frequencies, estimating ratio of power in each of the three regions to the total power of the time series, and generating at least six regression variables for each of the time series as low, medium, and high frequency power fraction of the reference and query periods.

The system can summarize the magnitudes of difference of metrics of a resource by averaging over the magnitudes of difference. The summarization can be done by determining an order statistic such as a median, maximum, or minimum.

Each of the features discussed in this particular implementation section for the first system implementation apply equally to the second system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

In another implementation, the technology disclosed presents a method of determining a magnitude of difference between a reference time series and a query time series.

The method includes transforming the reference and query time series by segmenting the time series into subsequences of overlapping or non-overlapping windows with time stamped boundaries, using a sub-sequence comparison function to compare adjacent window pairs and producing, for each window pair, a statistic or a significance value as a result of the comparison, and aligning the reference window pairs with the query window pairs by attaching, to respective statistics or significance values, a time stamp of one of the time stamped boundaries.

The method includes comparing the transformed reference and query time series using cross-correlation to determine the magnitude of difference between the reference and query time series.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

In yet another implementation, the technology disclosed presents a method of combining basic estimates of magnitudes of difference between two time series into an improved estimate.

The method includes sampling a training sample of resources and, for each sampled resource, sampling a set of time series along reference and query time periods.

The method includes receiving ideal magnitudes of difference estimates as target scores.

The method includes fitting a regression model to the target scores using the basic estimates of the magnitudes of difference.

The method includes storing output of the regression model as the improved estimate.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform the first method described above. Yet another implementation may include a system including memory and one or more processors operable to execute instructions, stored in the memory, to perform the first method described above.

Computer readable media (CRM) implementations of the technology disclosed include a non-transitory computer readable storage medium impressed with computer program instructions, when executed on a processor, implement the method described above.

Computer System

Figure 8:
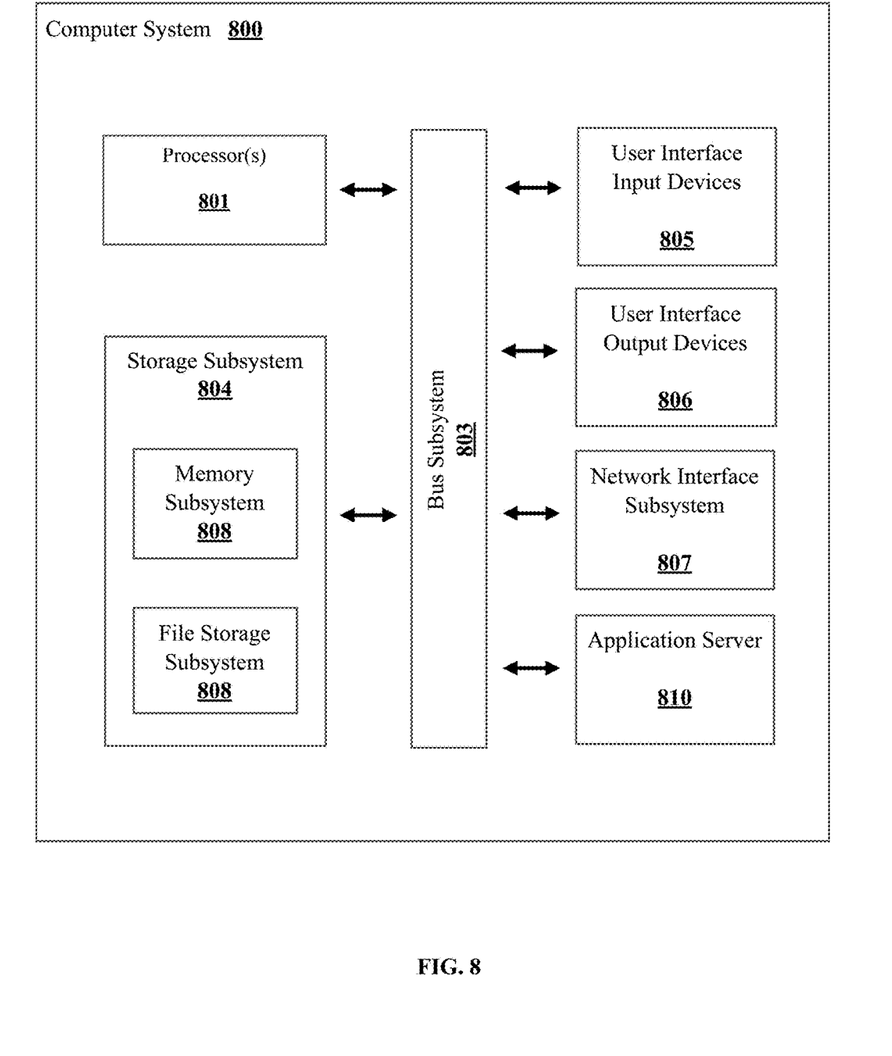
FIG. 8 is a block diagram of an example computer system for performing differential analysis over sets of time series pairs where the time series can be observations of distributed application and system performance metrics in a complex network setting.

FIG. 8 is a block diagram 800 of an example computer system 801 for performing differential analysis over sets of time series pairs where time series pairs can be observations of distributed application and system performance metrics in a complex network setting. Computer system 801 typically includes at least one processor 802 that communicates with a number of peripheral devices via bus subsystem 803. These peripheral devices can include a storage subsystem 804 including, for example, memory devices and a file storage subsystem, user interface input devices 805, user interface output devices 806, and a network interface subsystem 807. The input and output devices allow user interaction with computer system 801. Network interface subsystem 807 provides an interface to outside networks, including an interface to corresponding interface devices in other computer systems. The application server 810 can be a framework that allows the applications of computer system to run, with software running on hardware, e.g., the operating system.

User interface input devices 805 can include a keyboard; pointing devices such as a mouse; a scanner; a touch screen incorporated into the display; audio input devices such as a microphone; and other types of input devices. In general, use of the term "input device" is intended to include all possible types of devices and ways to input information into computer system 801.

User interface output devices 806 can include a visual output device such as a display monitor or a printer, or a non-visual output device such as an audio speaker. In general, use of the term "output device" is intended to include all possible types of devices and ways to output information from computer system 801 to the user or to another machine or computer system.

Storage subsystem 804 stores programming and data constructs that provide the functionality of some or all of the modules and methods described herein. Storage subsystem includes one or more memory subsystems 808 such as Random Access Memory as well as one or more file storage subsystems 809 such as hard disk drive. These software modules are generally executed by processor 802 alone or in combination with other processors.

Due to the ever-changing nature of computers and networks, the description of computer system 801 depicted in FIG. 8 is intended only as one example. Many other configurations of computer system 801 are possible having more or fewer components than the computer system depicted in FIG. 8.

It is to be understood that the above described embodiments and implementations are merely illustrative of numerous and varied other embodiments and implementations which may constitute applications of the principles of the invention. Such other embodiments and implementations may be readily devised by those skilled in the art without departing from the spirit or scope of this invention and it is our intent they be deemed within the scope of our invention.

What is claimed is:

1. A method of improving performance of a network under monitoring, the method including:
    accumulating, for a resource running on the network, data for a performance metric being applied to monitor the network, the data including a reference time series and a query time series, wherein the reference time series represents the performance metric during a historic time period and the query time series represents the performance metric during a current time period;
    transforming the reference time series and the query time series by:
    segmenting each time series into a sub-sequence of overlapping or non-overlapping windows with time stamped boundaries;
    using a sub-sequence comparison function to compare adjacent window pairs and producing, for each window pair, a statistic or a significance value as a result of the comparison; and
    aligning the adjacent window pairs determined for the reference time series with the adjacent window pairs determined for the query time series by attaching, to respective statistics or significance values, a time stamp of one of the time stamped boundaries;
    comparing the transformed reference and query time series using cross-correlation to determine a magnitude of difference between the reference and query time series; and
    based on the magnitude of difference determined, determining whether the resource is undergoing anomalous performance and whenever a resource is identified as undergoing anomalous performance, raising a signal that identifies anomalous performance for further action.

2. The method of claim 1, wherein the reference and query time series are reference and query time periods of a single time series.

3. The method of claim 2, wherein the single time series is a performance metric collected from a resource.

4. The method of claim 1, further including comparing the transformed reference and query time series by recording one minus a normalized cross-correlation and estimating the magnitude of difference between the reference and query time series.

5. The method of claim 1, wherein the sub-sequence comparison function is Kolmogorov-Smirnov (KS) test.

6. The method of claim 1, further including aligning the reference window pairs with the query window pairs by attaching, to the respective statistics or significance values, a time stamp of a right time stamped boundary of a right window or a time stamp of a left time stamped boundary of a left window or a time stamp of a left time stamped boundary of a right window or a time stamp of a right time stamped boundary of a left window, where time increases from left to right.

7. The method of claim 1, further including comparing the transformed reference and query time series by determining a dynamic-time-warping (DTW) distance and estimating the magnitude of difference between the reference and query time series.

8. The method of claim 1, further including applying the cross-correlation after smoothing the transformed reference and query time series by convolving with a square or a Gaussian kernel.

9. The method of claim 1, wherein raising a signal includes raising an exception interrupting a normal flow of processing at a monitoring terminal.

10. The method of claim 1, wherein further action includes rerouting traffic, obtaining further inspection; automatically searching for and applying a service update to the resource or automatically restarting the resource.

11. A method of combining basic estimates of magnitudes of difference between two time series of metrics into an improved estimate, the method including:
sampling a training sample of resources and, for each sampled resource, sampling a set of time series along reference and query time periods;
receiving ideal magnitudes of difference estimates as target scores;
fitting a regression model to the target scores using the basic estimates of the magnitudes of difference; and
storing output of the regression model as the improved estimate; and
wherein additional regression variables are generated using square and cross-product functions on the basic estimates of the magnitudes of difference by:
estimating a power spectrum density (PSD) of each of the time series;
estimating a total power in each time series;
dividing a frequency axis in to three regions as low, medium, and high frequencies;
estimating ratio of power in each of the three regions to the total power of the time series; and
generating at least six regression variables for each of the time series as low, medium, and high frequency power fraction of the reference and query periods.

12. The method of claim 11, further including summarizing the magnitudes of difference of a resource by averaging over the magnitudes of difference.

13. The method of claim 12, further including summarizing by determining an order statistic such as a median, maximum, or minimum.

14. The method of claim 11, wherein the training sample includes 10 resources and 12 metrics per resource.

15. The method of claim 11 further including receiving an ideal ordering of the metrics for each resource separately used as target orderings for fitting an ordinal regression model using the additional regression variables.

16. The method of claim 11, wherein the regression model is a linear model.

17. The method of claim 11, wherein the regression model is a nonlinear model, including a decision tree or a gradient boosted regression model.

18. A system including one or more processors coupled to memory, the memory loaded with computer instructions to improve performance of a monitored network by determining a magnitude of difference between a reference time series and a query time series, the instructions, when executed on the processors, implement actions comprising:
accumulating, for a resource running on the network, data for a performance metric being applied to monitor the network, the data including a reference time series and a query time series, wherein the reference time series represents the performance metric during a historic time period and the query time series represents the performance metric during a current time period;
transforming the reference time series and the query time series by:
segmenting each time series into a sub-sequence of overlapping or non-overlapping windows with time stamped boundaries;
using a sub-sequence comparison function to compare adjacent window pairs and producing, for each window pair, a statistic or a significance value as a result of the comparison; and
aligning the adjacent window pairs determined for the reference time series with the adjacent window pairs determined for the query time series by attaching, to respective statistics or significance values, a time stamp of one of the time stamped boundaries;
comparing the transformed reference and query time series using cross-correlation to determine a magnitude of difference between the reference and query time series; and
based on the magnitude of difference determined, determining whether the resource is undergoing anomalous performance and whenever a resource is identified as undergoing anomalous performance, raising a signal that identifies anomalous performance for further action.

19. A non-transitory computer readable storage medium impressed with computer program instructions to improve performance of a monitored network by determining a magnitude of difference between a reference time series and a query time series, the instructions, when executed on a processor, implement a method comprising:
accumulating, for a resource running on the network, data for a performance metric being applied to monitor the network, the data including a reference time series and a query time series, wherein the reference time series represents the performance metric during a historic time period and the query time series represents the performance metric during a current time period;
transforming the reference time series and the query time series by:
segmenting each time series into a sub-sequence of overlapping or non-overlapping windows with time stamped boundaries;

using a sub-sequence comparison function to compare adjacent window pairs and producing, for each window pair, a statistic or a significance value as a result of the comparison; and aligning the adjacent window pairs determined for the reference time series with the adjacent window pairs determined for the query time series by attaching, to respective statistics or significance values, a time stamp of one of the time stamped boundaries;

comparing the transformed reference and query time series using cross-correlation to determine a magnitude of difference between the reference and query time series; and based on the magnitude of difference determined, determining whether the resource is undergoing anomalous performance and whenever a resource is identified as undergoing anomalous performance, raising a signal that identifies anomalous performance for further action.

20. A system including one or more processors coupled to memory, the memory loaded with computer instructions to combine basic estimates of magnitudes of difference between two time series into an improved estimate, the instructions, when executed on the processors, implement actions of:

sampling a training sample of resources and, for each sampled resource, sampling a set of time series along reference and query time periods;

receiving ideal magnitudes of difference estimates as target scores;

fitting a regression model to the target scores using the basic estimates of the magnitudes of difference; and storing output of the regression model as the improved estimate; and wherein additional regression variables are generated using square and cross-product functions on the basic estimates of the magnitudes of difference by:

estimating a power spectrum density (PSD) of each of the time series;

estimating a total power in each time series;

dividing a frequency axis in to three regions as low, medium, and high frequencies;

estimating ratio of power in each of the three regions to the total power of the time series; and generating at least six regression variables for each of the time series as low, medium, and high frequency power fraction of the reference and query periods.

* * * * *